(12) United States Patent
Mutsuo et al.

(10) Patent No.: US 9,729,757 B2
(45) Date of Patent: Aug. 8, 2017

(54) IMAGE PROCESSING APPARATUS AND IMAGE FORMING APPARATUS

(71) Applicant: KYOCERA Document Solutions Inc., Osaka (JP)

(72) Inventors: Toshiaki Mutsuo, Osaka (JP); Seiki Satomi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/244,962

(22) Filed: Aug. 23, 2016

(65) Prior Publication Data

US 2017/0064140 A1    Mar. 2, 2017

(30) Foreign Application Priority Data

Aug. 28, 2015 (JP) ................. 2015-168872

(51) Int. Cl.
*H04N 1/405* (2006.01)
*H04N 1/60* (2006.01)

(52) U.S. Cl.
CPC ......... *H04N 1/4052* (2013.01); *H04N 1/4055* (2013.01); *H04N 1/60* (2013.01)

(58) Field of Classification Search
CPC ....... H04N 1/4052; H04N 1/4055; H04N 1/60
See application file for complete search history.

(56) References Cited

U.S. PATENT DOCUMENTS

2009/0161150 A1* 6/2009 Yu .............................. G06T 5/20
358/1.15
2010/0165409 A1* 7/2010 Tsukamoto .......... G09G 3/2044
358/3.01

FOREIGN PATENT DOCUMENTS

JP       2011-211503        10/2011

* cited by examiner

*Primary Examiner* — Quang N Vo

(57) ABSTRACT

A filter processing unit performs a bandpass filter process for a difference between an output pixel value and an input pixel value of an adjacent pixel to a target pixel. An error diffusion unit performs an error diffusion process of a quantization error for output of the filter processing unit. A quantizer performs quantization for a value obtained by the error diffusion process and thereby determines the output pixel value of the target pixel. The bandpass filter process is performed with characteristics different from each other (a) in respective ones of a primary scanning direction and a secondary scanning direction and (b) for respective ones of the component colors of the image. Furthermore, a filter coefficient of the bandpass filter process independently for each component color of an image is corrected for banding reduction with a correction coefficient corresponding to an angle from the primary scanning direction.

4 Claims, 6 Drawing Sheets

FIG. 2A $$\mathrm{DoG}(x, y) = \exp\left(-\left(\frac{x^2}{4\sigma_x^2} + \frac{y^2}{4\sigma_y^2}\right)\right) - \exp\left(-\left(\frac{x^2}{2\sigma_x^2} + \frac{y^2}{2\sigma_y^2}\right)\right)$$

FIG. 2B $$\mathrm{Gain}(x, y) = 1 - \left(\frac{\cos\left(\tan^{-1}\left(\frac{y}{x}\right)\right)}{2} \times \frac{x-y}{x}\right)$$

FIG. 2C $$\mathrm{Gain}(x, y) = 1 - \left(\frac{\cos\left(\tan^{-1}\left(\frac{x}{y}\right)\right)}{2} \times \frac{y-x}{y}\right)$$

FIG. 3
AFTER THE GAIN DISTRIBUTION ADJUSTMENT
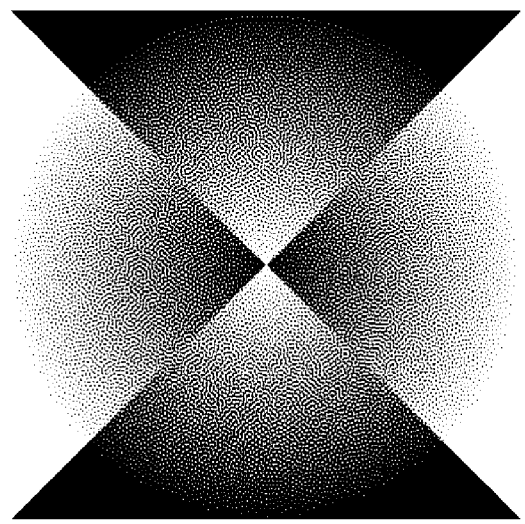
BEFORE THE GAIN DISTRIBUTION ADJUSTMENT
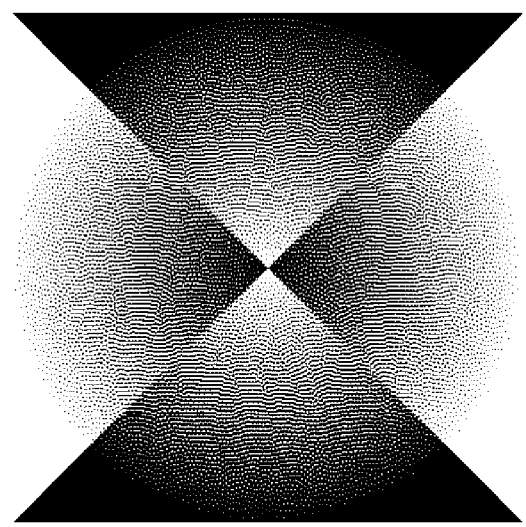

FIG. 4
AFTER THE GAIN DISTRIBUTION ADJUSTMENT
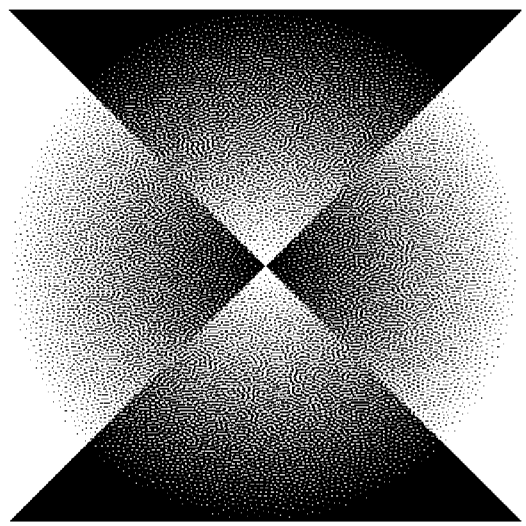
BEFORE THE GAIN DISTRIBUTION ADJUSTMENT
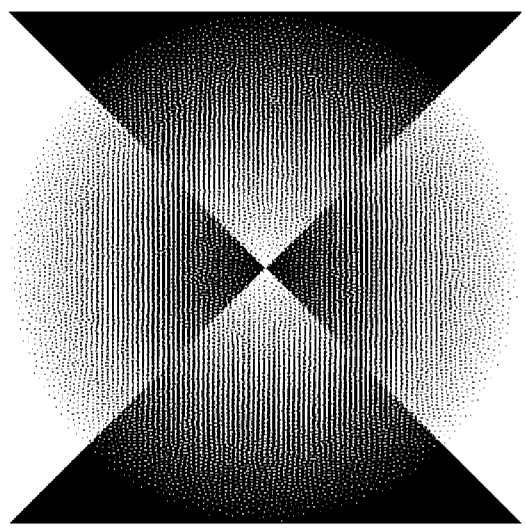

FIG. 5
AFTER THE GAIN DISTRIBUTION ADJUSTMENT
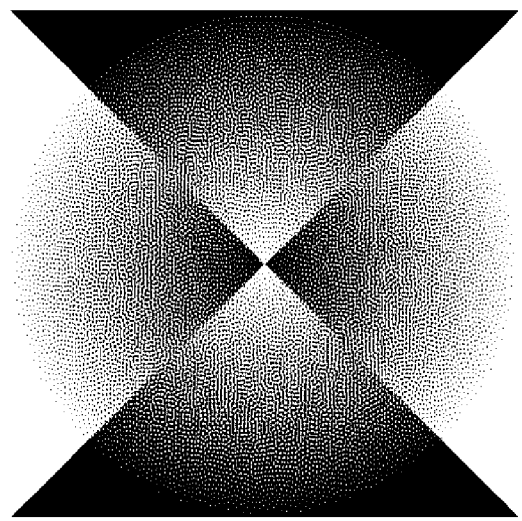
BEFORE THE GAIN DISTRIBUTION ADJUSTMENT
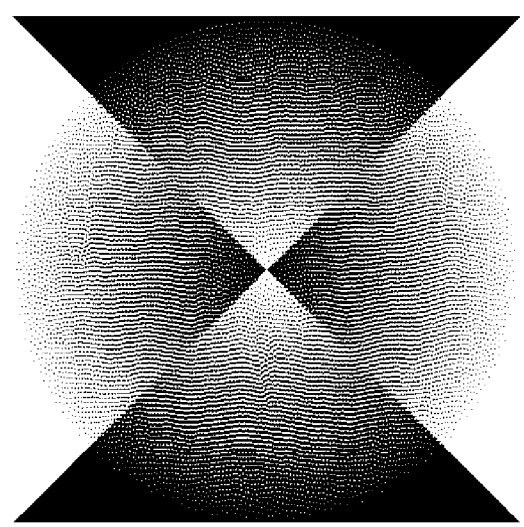

FIG. 6
AFTER THE GAIN DISTRIBUTION ADJUSTMENT
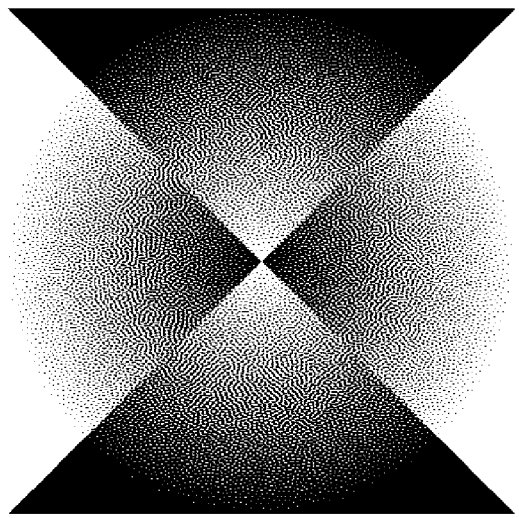
BEFORE THE GAIN DISTRIBUTION ADJUSTMENT
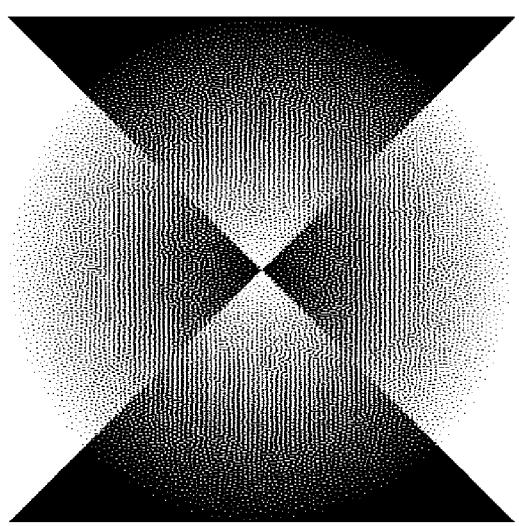

IMAGE PROCESSING APPARATUS AND IMAGE FORMING APPARATUS

CROSS-REFERENCE TO RELATED APPLICATIONS

This application relates to and claims priority rights from Japanese Patent Application No. 2015-168872, filed on Aug. 28, 2015, the entire disclosures of which are hereby incorporated by reference herein.

BACKGROUND

1. Field of the Present Disclosure

The present disclosure relates to an image processing apparatus and an image forming apparatus.

2. Description of the Related Art

When binarizing an input pixel value, an image processing apparatus performs quantization (i.e. binarization) with error diffusion of a value obtained by subtracting (a) a value obtained by applying a spatial bandpass filter to an output pixel value from (b) a value obtained by applying a spatial lowpass filter to the input pixel value. Consequently, output dots after the binarization are clustered with a cluster size (i.e. a condensing degree of output dots) corresponding to a filter characteristic of the bandpass filter.

However, in some images to be outputted as color images, the aforementioned technique causes granular quality.

SUMMARY

An image processing apparatus according to an aspect of the present disclosure outputs as an output pixel value a binarized pixel value obtained by binarization of an input pixel value for each component color of an image, and includes: a filter processing unit, an error diffusion unit, and a quantizer. The filter processing unit is configured to perform a bandpass filter process for a difference between the output pixel value and the input pixel value of an adjacent pixel to a target pixel. The error diffusion unit is configured to perform an error diffusion process of a quantization error for output of the filter processing unit. The quantizer is configured to perform quantization for a value obtained by the error diffusion process and thereby determine the output pixel value of the target pixel. Further, the filter processing unit performs the bandpass filter process with characteristics different from each other (a) in respective ones of a primary scanning direction and a secondary scanning direction and (b) for respective ones of the component colors of the image. Furthermore, a filter coefficient of the bandpass filter process independently for each one of the component colors of the image is corrected for banding reduction with a correction coefficient corresponding to an angle from the primary scanning direction.

An image forming apparatus according to an aspect of the present disclosure includes the aforementioned image processing apparatus.

These and other objects, features and advantages of the present disclosure will become more apparent upon reading of the following detailed description along with the accompanied drawings.

BRIEF DESCRIPTION OF THE DRAWINGS

FIGS. 2A to 2C show diagrams that explain a filter coefficient and a correction coefficient of a DoG filter that composes a filter coefficient used in the image processing apparatus shown in FIG. 1;

FIG. 3 shows a diagram that explains a gain distribution adjustment for the filter coefficient of a component color K;

FIG. 4 shows a diagram that explains a gain distribution adjustment for the filter coefficient of a component color C;

FIG. 5 shows a diagram that explains a gain distribution adjustment for the filter coefficient of a component color M; and FIG. 6 shows a diagram that explains a gain distribution adjustment for the filter coefficient of a component color Y.

DETAILED DESCRIPTION

Figure 1:
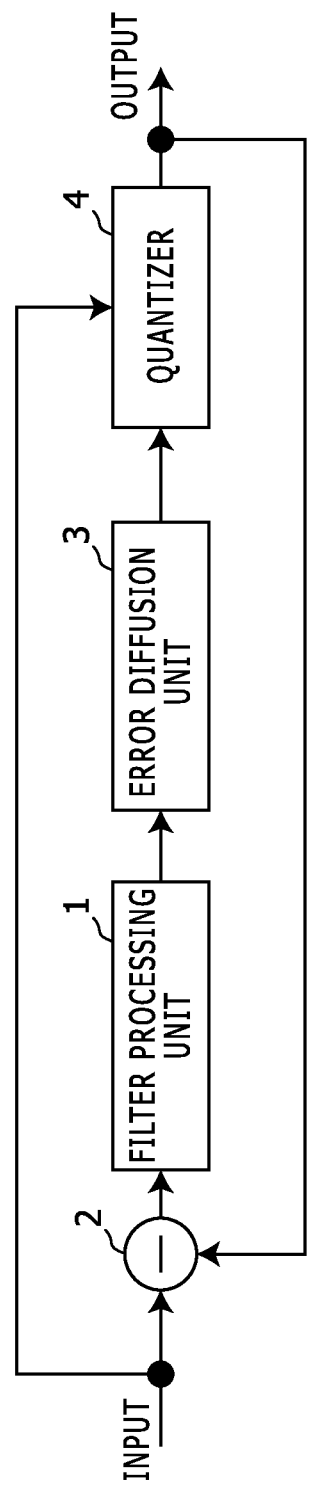
FIG. 1 shows a block diagram that indicates a configuration of an image processing apparatus according to an embodiment of the present disclosure.

Hereinafter, an embodiment according to an aspect of the present disclosure will be explained with reference to drawings.

FIG. 1 shows a block diagram that indicates a configuration of an image processing apparatus according to an embodiment of the present disclosure. The image processing apparatus shown in FIG. 1 binarizes an input pixel value and outputs a pixel value after the binarization as an output pixel value, and for example, is included in an image forming apparatus such as a printer, a copier, or a multi function peripheral. This image processing apparatus is configured as a computer, ASIC (Application Specific Integrated Circuit), and/or the like. The input pixel value is a value corresponding to one of multi gradation levels such as an 8 bit value, and has any value from 0 to 1. The output pixel value has any one of 0 and 1.

The image processing apparatus shown in FIG. 1 includes a filter processing unit 1, a subtracter 2, an error diffusion unit 3, and a quantizer 4.

Independently for each one of component colors (here, Cyan C, Magenta M, Yellow Y and Black K) of an image, the filter processing unit 1 performs a filter process for a difference obtained by the subtracter 2 between the output pixel value and the input pixel value of an adjacent pixel to a target pixel. Specifically, the filter processing unit performs an operation for sum of products between the aforementioned differences and the filter coefficients on the respective adjacent pixels to the target pixel.

The subtracter 2 calculates a difference between the output pixel value and the input pixel value of an adjacent pixel to the target pixel. Prior to the calculation of the difference, the output pixel value as a binarized value is converted to a value corresponding to one of multi gradation levels, and then the difference is calculated.

In this embodiment, the aforementioned operation for sum of products is performed between (a) the aforementioned differences on pixels in a window and (b) a filter matrix having the same size of the window, and the filter matrix is obtained by multiplying correction coefficients to filter coefficients of a DoG (Difference of Gaussian) filter that has a bandpass characteristic obtained by a difference between two Gaussian functions, respectively.

Specifically, the filter processing unit 1 performs the bandpass filter process with characteristics different from each other (a) in respective ones of a primary scanning direction and a secondary scanning direction and (b) for respective ones of the component colors of the image. A filter coefficient of the bandpass filter process independently for each one of the component colors of the image is corrected for banding reduction with a correction coefficient corresponding to an angle from the primary scanning direction.

In this embodiment, the aforementioned bandpass filter process has a bandpass characteristic that is (a) obtained by a difference between two Gaussian functions and (b) corrected by the correction coefficient; and the Gaussian functions are set so as to have variance values different from each other in respective ones of the primary scanning direction and the secondary scanning direction. In addition, independently for each one of the component colors, a pair of the variance values in the primary scanning direction and the secondary scanning direction for each one of the component colors is set so as to be different from pairs of the variance values for the other component colors.

FIGS. 2A to 2C show diagrams that explain a filter coefficient and a correction coefficient of a DoG filter that composes a filter coefficient used in the image processing apparatus shown in FIG. 1.

In this embodiment, the filter coefficient "Coefficient (x, y)" of the bandpass filter process is a product of (a) the filter coefficient "DoG (x, y)" of the DoG filter as a difference between the aforementioned two Gaussian functions and (b) the correction coefficient "Gain (x, y)". Here, "x" and "y" indicate distances (the number of pixels) from a center of the filter matrix (i.e. a target pixel) in the primary scanning direction (i.e. x direction) and in the secondary scanning direction (i.e. y direction), respectively.

The filter coefficient DoG (x, y) of the DoG filter has a value calculated by a formula shown in FIG. 2A, for example.

If the variance value in the primary scanning direction is larger than the variance value in the secondary scanning direction, the correction coefficient Gain (x, y) of the filter coefficient is set as a larger value for a larger angle from the primary scanning direction to the filter coefficient when setting a center of the filter matrix of the bandpass filter as an original point for the angle.

In this case, the correction coefficient has a value calculated by a formula shown in FIG. 2B, for example. For example, in the formula shown in FIG. 2B, for a pixel on the x axis (i.e. a pixel where y=0 and the angle from the primary scanning direction is zero degrees), Gain (x, y) gets 0.5; for a pixel on a straight line of y=x (i.e. a pixel where y=x and the angle from the primary scanning direction is 45 degrees), Gain (x, y) gets 1; and for a pixel on the y axis (i.e. a pixel where x=0 and the angle from the primary scanning direction is 90 degrees), Gain (x, y) gets 1.5. Thus, the correction coefficient Gain (x, y) gets a larger value for the filter coefficient on a larger angle from the primary scanning direction.

Contrarily, if the variance value in the secondary scanning direction is larger than the variance value in the primary scanning direction, the correction coefficient of the filter coefficient is set as a larger value for a larger angle from the secondary scanning direction to the filter coefficient when setting a center of the filter matrix of the bandpass filter as an original point for the angle.

In this case, the correction coefficient has a value calculated by a formula shown in FIG. 2C, for example. For example, in the formula shown in FIG. 2C, for a pixel on the y axis (i.e. a pixel where x=0 and the angle from the secondary scanning direction is zero degrees), Gain (x, y) gets 0.5; for a pixel on a straight line of y=x (i.e. a pixel where y=x and the angle from the secondary scanning direction is 45 degrees), Gain (x, y) gets 1; and for a pixel on the x axis (i.e. a pixel where y=0 and the angle from the secondary scanning direction is 90 degrees), Gain (x, y) gets 1.5. Thus, the correction coefficient Gain (x, y) gets a larger value for the filter coefficient on a larger angle from the secondary scanning direction.

Using the aforementioned correction coefficient, a gain distribution in the filter matrix of the DoG filter is adjusted.

FIG. 3 shows a diagram that explains a gain distribution adjustment for the filter coefficient of a component color K. FIG. 4 shows a diagram that explains a gain distribution adjustment for the filter coefficient of a component color C. FIG. 5 shows a diagram that explains a gain distribution adjustment for the filter coefficient of a component color M. FIG. 6 shows a diagram that explains a gain distribution adjustment for the filter coefficient of a component color Y.

In the example shown in FIGS. 3 to 6, the variances ($\sigma x^2$, $\sigma y^2$) of Gaussian function in the primary scanning direction and the secondary scanning direction are set as (1.5, 3.0) for the component color K; the variances ($\sigma x^2$, $\sigma y^2$) of Gaussian function in the primary scanning direction and the secondary scanning direction are set as (4.0, 1.33) for the component color C; the variances ($\sigma x^2$, $\sigma y^2$) of Gaussian function in the primary scanning direction and the secondary scanning direction are set as (1.33, 4.0) for the component color M; and the variances ($\sigma x^2$, $\sigma y^2$) of Gaussian function in the primary scanning direction and the secondary scanning direction are set as (3.0, 1.5) for the component color Y.

In this example, the Gaussian function for the component color K has the variance in the primary scanning direction smaller than the variance in the secondary scanning direction, and therefore, if the aforementioned gain distribution adjustment were not performed, then horizontal stripes would appear as banding as shown in FIG. 3, but here the aforementioned gain distribution adjustment restrains the banding as shown in FIG. 3.

Further, in this example, the Gaussian function for the component color C has the variance in the primary scanning direction larger than the variance in the secondary scanning direction, and therefore, if the aforementioned gain distribution adjustment were not performed, then vertical stripes would appear as banding as shown in FIG. 4, but here the aforementioned gain distribution adjustment restrains the banding as shown in FIG. 4.

Furthermore, in this example, the Gaussian function for the component color M has the variance in the primary scanning direction smaller than the variance in the secondary scanning direction, and therefore, if the aforementioned gain distribution adjustment were not performed, then horizontal stripes would appear as banding as shown in FIG. 5, but here the aforementioned gain distribution adjustment restrains the banding as shown in FIG. 5.

Furthermore, in this example, the Gaussian function for the component color Y has the variance in the primary scanning direction larger than the variance in the secondary scanning direction, and therefore, if the aforementioned gain distribution adjustment were not performed, then vertical stripes would appear as banding as shown in FIG. 6, but here the aforementioned gain distribution adjustment restrains the banding as shown in FIG. 6.

As mentioned, the different variances in the primary and secondary scanning directions result in different cluster sizes (condensing degree of binarized pixels) in the primary and secondary scanning directions, consequently banding easily appears. However, the banding is restrained by the aforementioned gain distribution adjustment restrains using different correction characteristics depending on that, in which one of the both scanning directions, the variance is larger (or smaller) than the variance in the other scanning direction.

It should be noted that the target pixel is selected so as to move along the primary scanning direction and the secondary scanning direction (or meandering scanning) and therefore an output pixel value has not been calculated for a subsequent pixel after the current target pixel. Therefore, the filter processing unit 1 performs the operation for sum of products between the aforementioned differences that have been derived and the filter coefficients, within the adjacent pixels to the target pixel. In other words, with considering the difference on the subsequent pixel as zero, the operation for sum of products is performed between the aforementioned differences and the filter coefficients.

The error diffusion unit 3 performs an error diffusion process of a quantization error for output of the filter processing unit 1. Specifically, the error diffusion unit 3 diffuses a difference between an output value of the filter processing unit 1 and a threshold value (here, 0) of the quantizer 4 to subsequent pixels.

The quantizer 4 performs quantization for a value obtained by the error diffusion process performed by the error diffusion unit 3 and thereby determines the output pixel value of the target pixel. Here, the threshold value is set as 0; and if the output of the error diffusion unit 3 is equal to or larger than 0, then the output pixel value is set as 1, and otherwise the output pixel value is set as 0. If the input pixel value of the target pixel is 0 or 1, then the quantizer 4 sets the output pixel value of the target pixel as 0 or 1 as is.

The following part explains a behavior of the aforementioned image processing apparatus of this embodiment.

For a color plane of each component color of one image, this image processing apparatus selects a target pixel in turn along a predetermined scanning pattern, and derives an output pixel value of the target pixel in turn.

Firstly, on the basis of input pixel values of the target pixel and its adjacent pixels, the subtracter 2 calculates differences between the input pixel values and the output pixel values for the adjacent pixels (i.e. pixels within a window that has the same size as the filter process of the filter processing unit 1), and the filter processing unit 1 performs the aforementioned filter process for the differences for the adjacent pixels.

The error diffusion unit 3 determines a quantization error in the quantizer 4 for an output value of the filter processing unit 1, and diffuses the quantization error to subsequent pixels with a predetermined error diffusion pattern (e.g. Floyd-Steinberg method or the like) and adds an error diffused to the current target pixel onto the output value of the filter processing unit 1 for the current target pixel.

The quantizer 4 performs quantization for a value obtained by the aforementioned error diffusion process performed by the error diffusion unit 3 and thereby determines the output pixel value.

In the aforementioned manner, after obtaining binary images based on the aforementioned output pixel values for all of the component colors (here, CMYK), these binary images are developed using toner of respective colors, and outputted as one color output image.

In the aforementioned embodiment, the filter processing unit 1 performs a bandpass filter process for a difference between an output pixel value and an input pixel value of an adjacent pixel to a target pixel; the error diffusion unit 3 performs an error diffusion process of a quantization error for output of the filter processing unit 1; and the quantizer 4 performs quantization for a value obtained by the error diffusion process and thereby determines the output pixel value of the target pixel. Further, the filter processing unit 1 performs the bandpass filter process with characteristics different from each other (a) in respective ones of a primary scanning direction and a secondary scanning direction and (b) for respective ones of the component colors of the image. Furthermore, a filter coefficient of the bandpass filter process independently for each one of the component colors of the image is corrected for banding reduction with a correction coefficient corresponding to an angle from the primary scanning direction.

Consequently, in a color output image, output dots are clustered and the granular quality is restrained.

Specifically, the bandpass filter process is performed with characteristics different from each other (a) in respective ones of a primary scanning direction and a secondary scanning direction and (b) for respective ones of the component colors of the image, and thereby the granular quality is restrained, and in addition, the banding due to the bandpass filter process is restrained using the correction coefficient.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus that outputs as an output pixel value a binarized pixel value obtained by binarization of an input pixel value for each component color of an image, comprising:
    a filter processing unit configured to perform a bandpass filter process for a difference between the output pixel value and the input pixel value of an adjacent pixel to a target pixel;
    an error diffusion unit configured to perform an error diffusion process of a quantization error for output of the filter processing unit; and
    a quantizer configured to perform quantization for a value obtained by the error diffusion process and thereby determine the output pixel value of the target pixel;
    wherein the filter processing unit performs the bandpass filter process with characteristics different from each other (a) in respective ones of a primary scanning direction and a secondary scanning direction and (b) for respective ones of the component colors of the image; and
    a filter coefficient of the bandpass filter process independently for each one of the component colors of the image is corrected for banding reduction with a correction coefficient corresponding to an angle from the primary scanning direction.

2. The image processing apparatus according to claim 1, wherein:
    the bandpass filter process has a bandpass characteristic that is (a) obtained by a difference between two Gaussian functions and (b) corrected by the correction coefficient; and
    the Gaussian functions have variance values different from each other in respective ones of the primary scanning direction and the secondary scanning direction.

3. The image processing apparatus according to claim 2, wherein:
- the filter coefficient of the bandpass filter process is a product of (a) the difference between two Gaussian functions and (b) the correction coefficient; and
- if the variance value in the primary scanning direction is larger than the variance value in the secondary scanning direction, the correction coefficient of the filter coefficient has a larger value for a larger angle from the primary scanning direction to the filter coefficient when setting a center of a filter matrix of the bandpass filter as an original point for the angle; and
- if the variance value in the secondary scanning direction is larger than the variance value in the primary scanning direction, the correction coefficient of the filter coefficient has a larger value for a larger angle from the secondary scanning direction to the filter coefficient when setting a center of a filter matrix of the bandpass filter as an original point for the angle.

4. An image forming apparatus, comprising
an image processing apparatus that outputs as an output pixel value a binarized pixel value obtained by binarization of an input pixel value for each component color of an image;
wherein the image processing apparatus comprises:
- a filter processing unit configured to perform a bandpass filter process for a difference between the output pixel value and the input pixel value of an adjacent pixel to a target pixel;
- an error diffusion unit configured to perform an error diffusion process of a quantization error for output of the filter processing unit; and
- a quantizer configured to perform quantization for a value obtained by the error diffusion process and thereby determine the output pixel value of the target pixel;
- wherein the filter processing unit performs the bandpass filter process with characteristics different from each other (a) in respective ones of a primary scanning direction and a secondary scanning direction and (b) for respective ones of the component colors of the image; and
- a filter coefficient of the bandpass filter process independently for each one of the component colors of the image is corrected for banding reduction with a correction coefficient corresponding to an angle from the primary scanning direction.

* * * * *